(12) United States Patent
Sinha et al.

(10) Patent No.: US 8,131,994 B2
(45) Date of Patent: Mar. 6, 2012

(54) DUAL CRYPTOGRAPHIC KEYING

(75) Inventors: Santanu Sinha, Cupertino, CA (US);
Kenneth William Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 1014 days.

(21) Appl. No.: 11/756,783

(22) Filed: Jun. 1, 2007

(65) Prior Publication Data

US 2008/0301429 A1 Dec. 4, 2008

(51) Int. Cl.
*H04L 29/00* (2006.01)
(52) U.S. Cl. ........ 713/151; 713/150; 713/152; 713/158; 713/160; 713/168; 726/2; 726/13; 726/14; 380/274; 380/249; 380/270; 380/277; 709/227; 709/228; 709/229
(58) Field of Classification Search .......... 713/150–152, 713/158–168, 178; 709/227–229
See application file for complete search history.

(56) References Cited

U.S. PATENT DOCUMENTS

| | | | |
|---|---|---|---|
| 6,253,321 B1 * | 6/2001 | Nikander et al. | 713/160 |
| 6,298,428 B1 * | 10/2001 | Munroe et al. | 711/202 |
| 7,124,293 B2 * | 10/2006 | Mualem et al. | 713/151 |
| 7,188,250 B1 * | 3/2007 | Alfieri et al. | 713/181 |
| 7,280,540 B2 * | 10/2007 | Halme et al. | 370/392 |

(Continued)

OTHER PUBLICATIONS

Paul, Souradyuti and Bart Preneel, "A New Weakness in the RC4 Keystream Generator and an Approach to Improve the Security of the Cipher", *Fast Software Encription, FSE 2004*, Lecture Notes in Computer Science, Springer-Verlag, pp. 245-259, 2004.

(Continued)

*Primary Examiner* — Taghi Arani
*Assistant Examiner* — Amir Mehrmanesh
(74) *Attorney, Agent, or Firm* — Baker Botts L.L.P.

(57) ABSTRACT

A dual cryptographic keying system. In particular implementations, a method includes responsive to an initial session key negotiation, storing security association information for a tunnel in a security association memory; responsive to a session key renegotiation, storing security association information for the tunnel in a cache; decrypting received packets associated with the tunnel conditionally using the security association information in the cache or the security association information in the security association memory; and upon an expiration condition, overwriting the security association information, for the tunnel, in the security association memory with the security association information, for the tunnel, copied from the cache.

24 Claims, 7 Drawing Sheets

U.S. PATENT DOCUMENTS

| | | | |
|---|---|---|---|
| 7,649,998 B2* | 1/2010 | Harran et al. | 380/283 |
| 2004/0049585 A1* | 3/2004 | Swander | 709/229 |
| 2005/0154873 A1* | 7/2005 | Cam-Winget et al. | 713/150 |
| 2005/0160095 A1* | 7/2005 | Dick et al. | 707/10 |
| 2005/0232428 A1* | 10/2005 | Little et al. | 380/277 |
| 2006/0002388 A1* | 1/2006 | Grebus et al. | 370/389 |
| 2006/0104308 A1* | 5/2006 | Pinkerton et al. | 370/469 |
| 2006/0184656 A1* | 8/2006 | Roddy | 709/223 |

OTHER PUBLICATIONS

Dierks, T., Independent, and Rescorla, E., RTFM. Inc., "The Transport Layer Security (TLS) Protocol", Version 1.1, *Network Working Group, Request for Comments No. 4346*, Apr. 2006.

Rescorla, E., RTFM, Inc., and Modadugu, N., Stanford University, "Datagram Transport Layer Security,", *Network Working Group, Request for Comments No. 4347*, Apr. 2006.

* cited by examiner

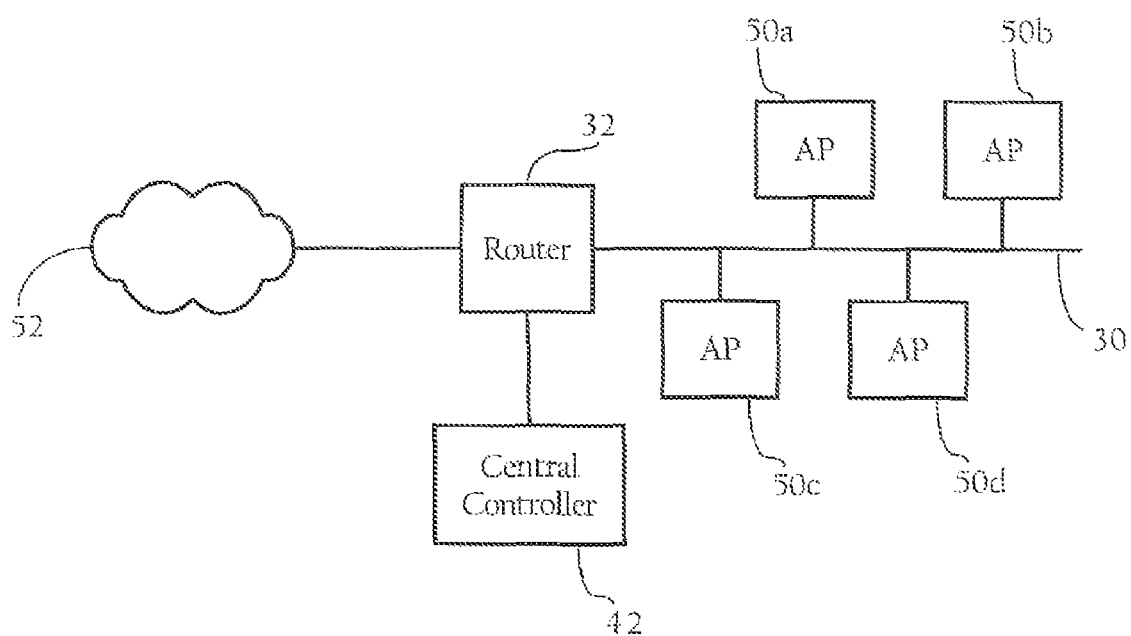
Fig._1A

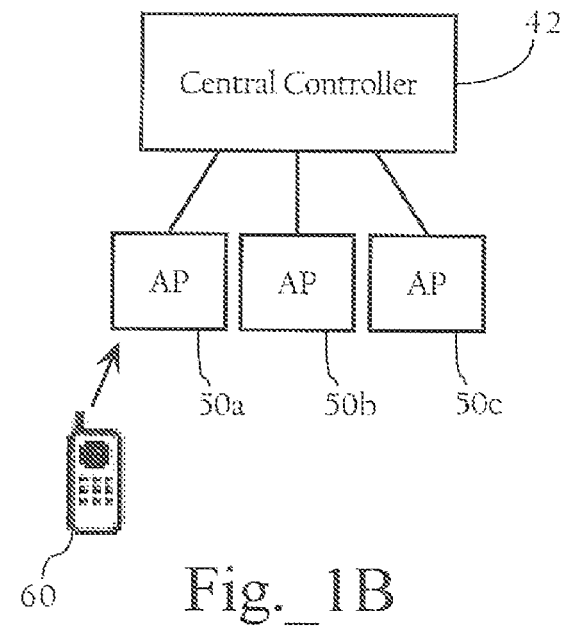
Fig._1B
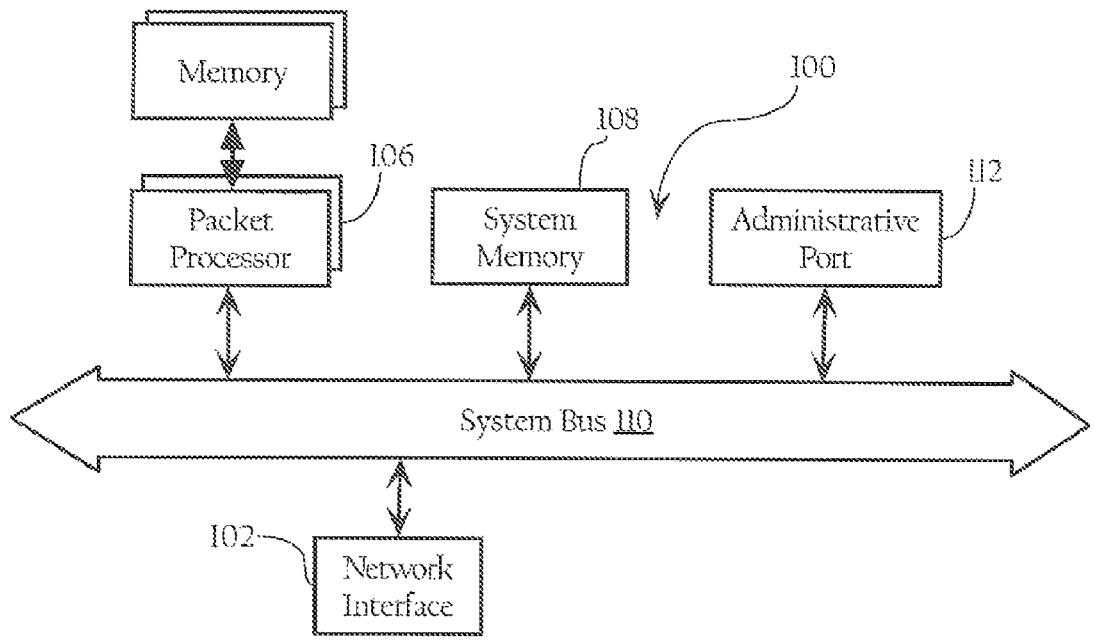
Fig._1C

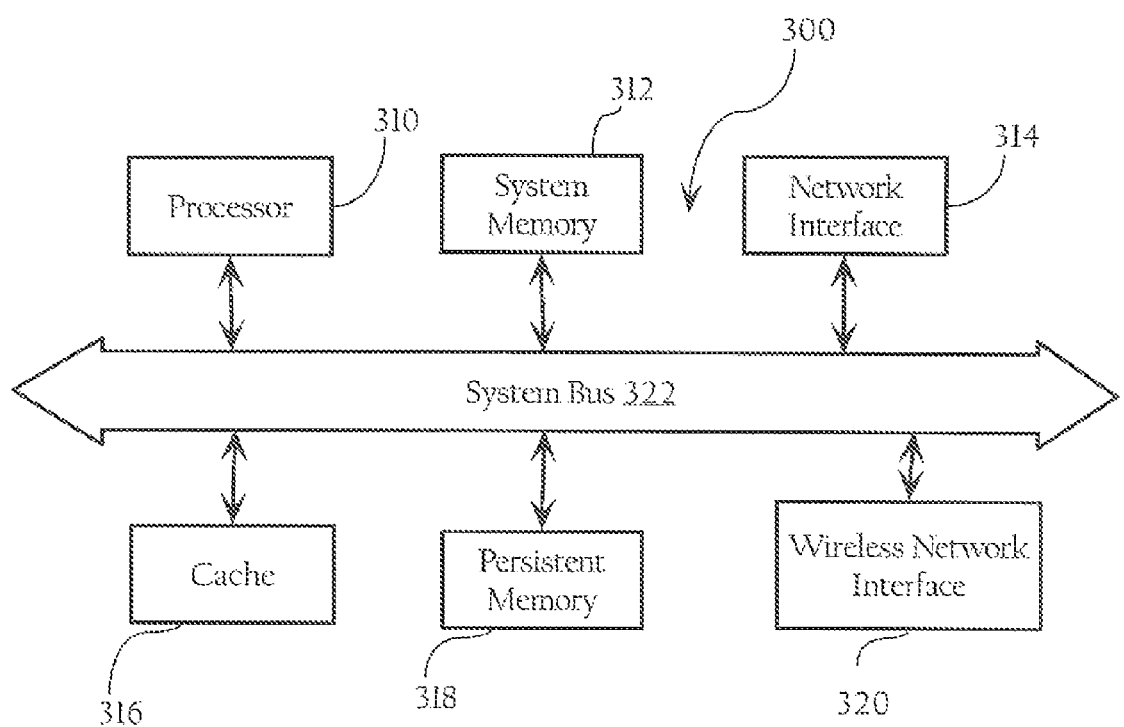
Fig._2

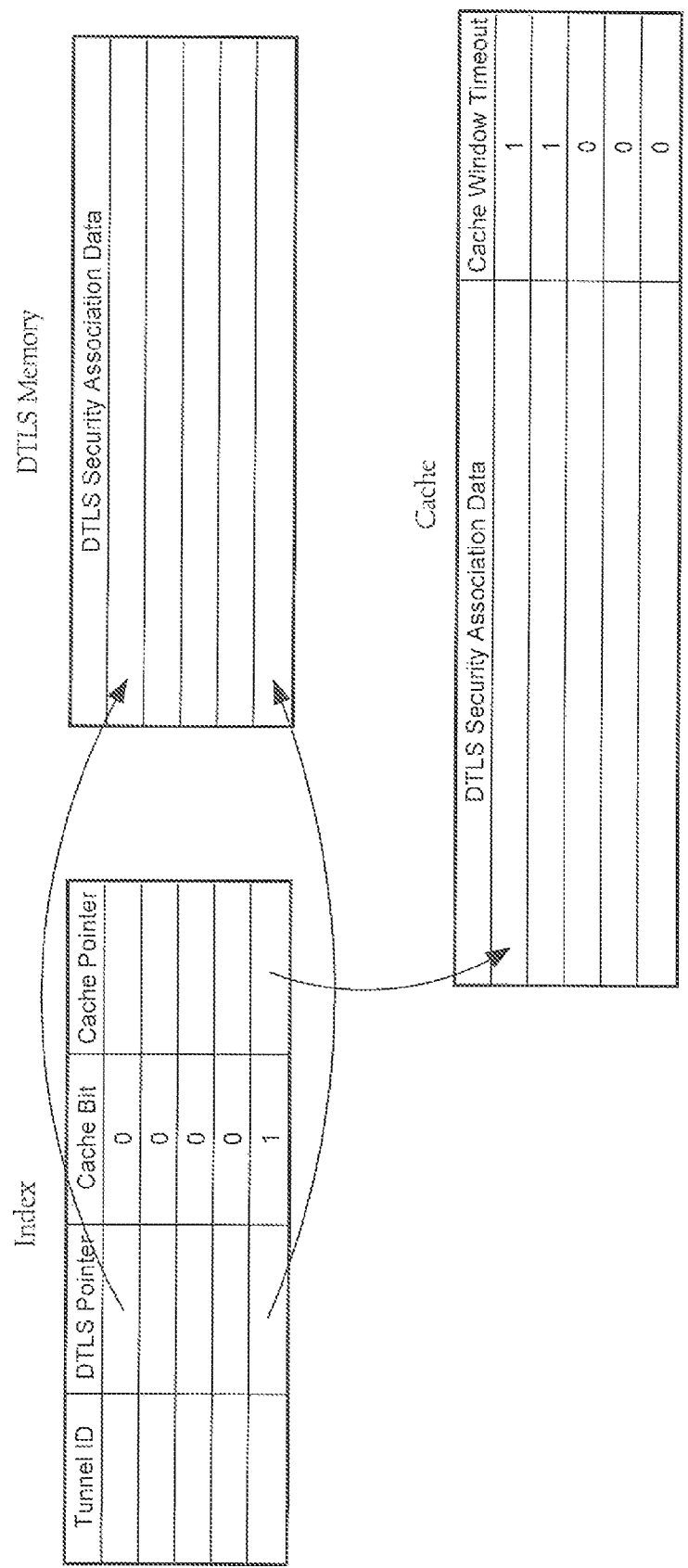
Fig._3

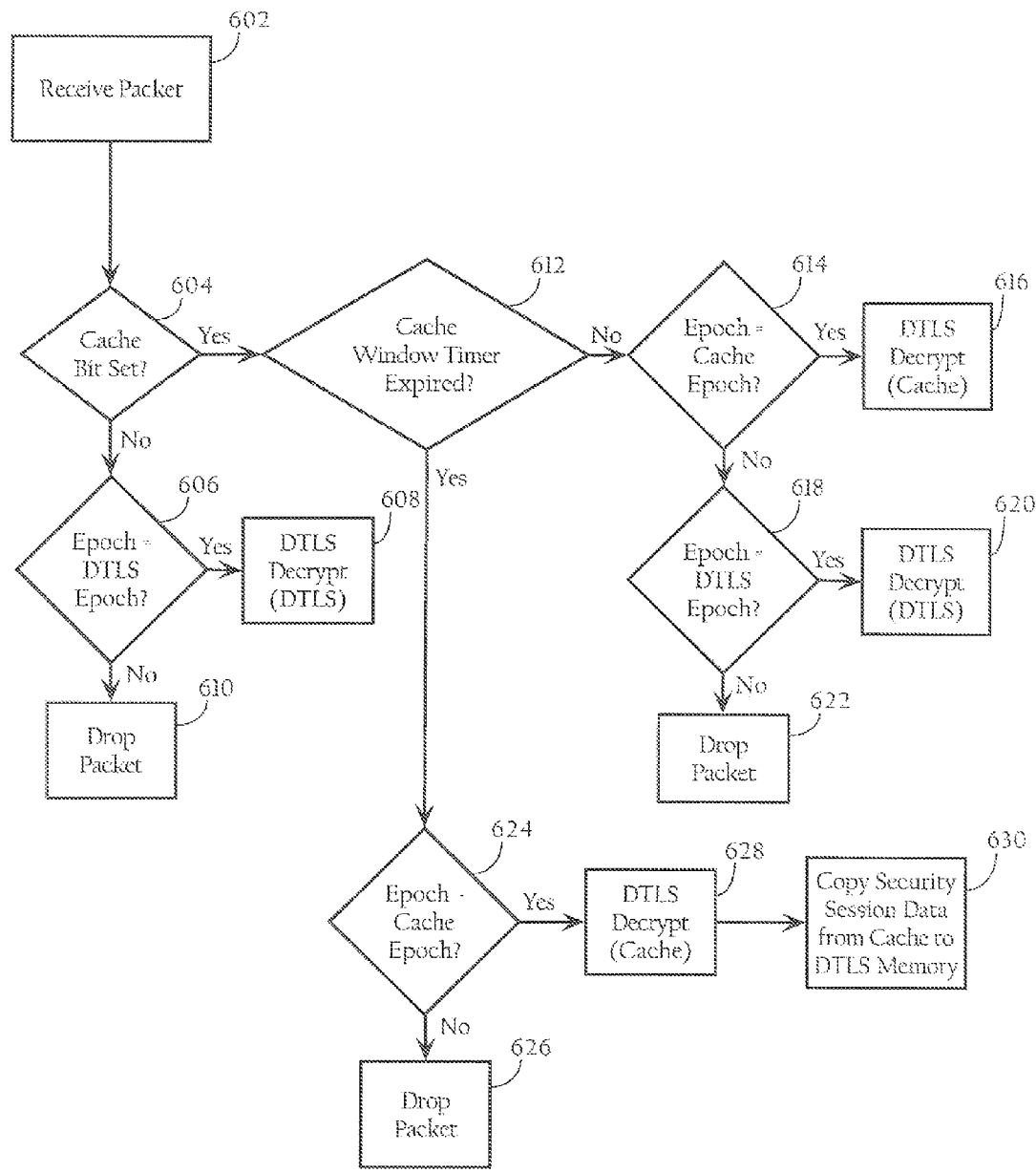
Fig._6

US 8,131,994 B2

DUAL CRYPTOGRAPHIC KEYING

TECHNICAL FIELD

This disclosure relates generally to cryptographic keying in computer networks.

BACKGROUND

The network communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communication networks are being built and expanded using various packet technologies, such as Internet Protocol (IP).

A network node such as a switch or router typically receives, processes, and forwards a packet based on one or more criteria, including the type of protocol used by the packet, addresses of the packet (e.g., source, destination, group), and type or quality of service requested. Additionally, one or more security operations are typically performed on each packet. Before these operations can be performed, a packet classification operation must typically be performed on the packet.

For secure communication over a network such as wireless networks and the Internet, packets exchanged between network nodes are encrypted according to cryptographic standards such as Transport Layer Security (TLS) and Datagram TLS. DTLS mandates that keys be periodically changed to avoid detection. Unlike the TLS standard where bundle of packets are decrypted together, the DTLS standard allows each packet to be decrypted separately. The DTLS change cipher specification is primarily based on the TLS specification with the added benefit that there is an epoch number in the DTLS header that changes with cipher specification changes. Regarding the cipher specification change, the TLS specification indicates that once the ChangeCipherSpec has been sent, the TLS standard mandates that the new Cipher-Spec must be used. The first node to send the ChangeCipher-Spec does not know if the other node has finished computing the new keying material. Thus, there can be a small window of time during which the recipient must buffer the data that has been encrypted with new keys.

TLS is a software based specification. Hence, the buffering of packets received with the new key is considered acceptable. Because DTLS is used by Control and Provisioning of Wireless Access Points (CAPWAP) and other access protocols and devices, future switches and routers may support DTLS in hardware and support multiple Gigabit bandwidths. Because of high performance and bandwidth supported by many access devices (such as switches and routers), the number of packets that can be received and buffered in the window of time while key materials are re-computed may be very large. Furthermore, Quality of Service features in the network can cause reordering of packets to occur due to prioritization. For hardware implementations, the resources required to buffer received packets during re-key operations may be cost prohibitive even with only a couple of gigabit performance.

DESCRIPTION OF THE DRAWINGS

FIG. 1A illustrates example components in a wireless local area network (WLAN) system.

FIG. 1B illustrates an example hierarchical wireless network including a central controller.

FIG. 1C illustrates an example hardware system, which may be used to implement a central controller.

FIG. 2 illustrates an example hardware system, which may be used to implement a wireless access point.

FIG. 3 illustrates example data structures, which may be implemented at a central controller and at one or more wireless access points.

FIG. 6 illustrates an example process flow associated with real-time processing of packets.

DESCRIPTION OF EXAMPLE EMBODIMENTS

A. Overview

Figure 4:
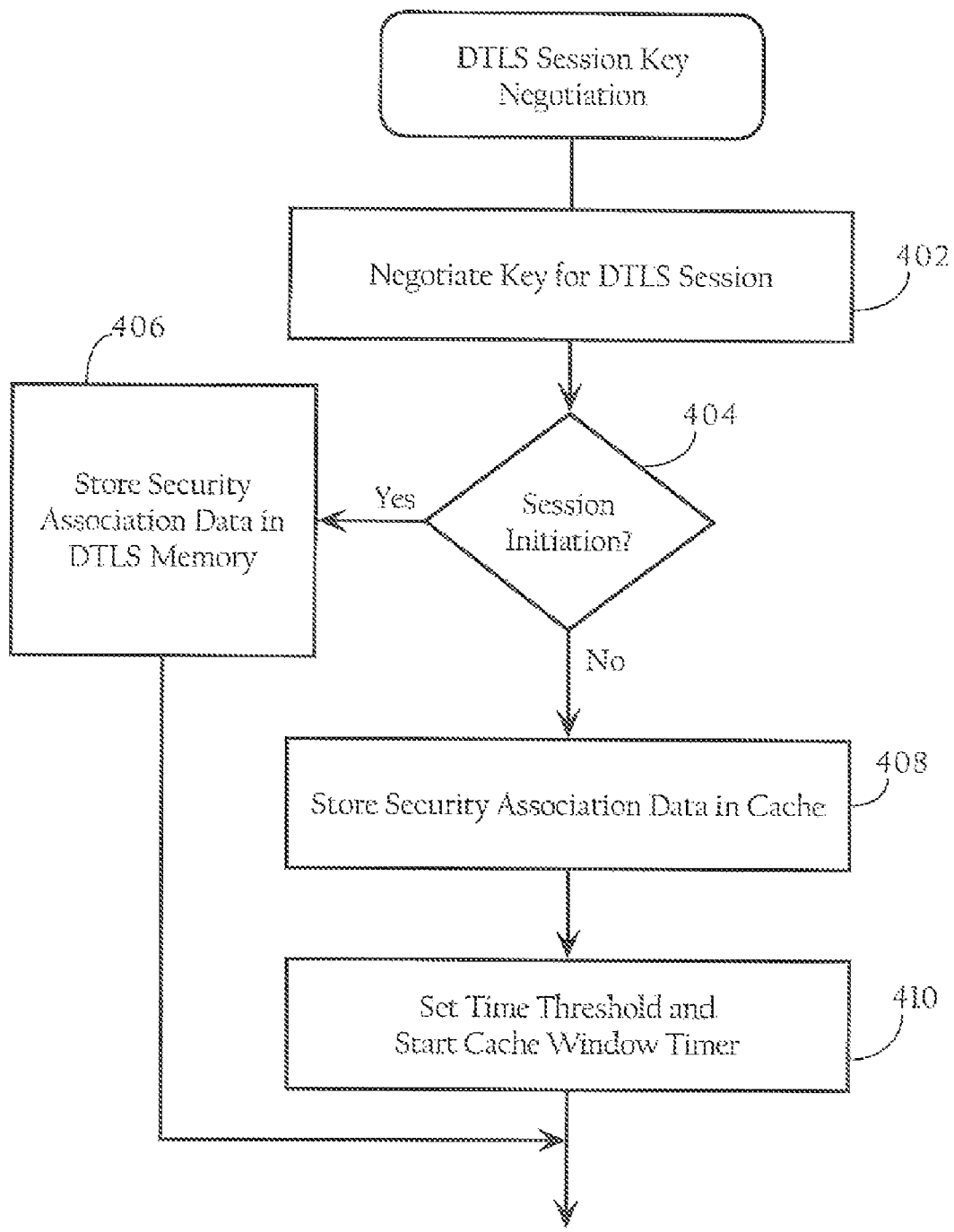
FIG. 4 illustrates an example process flow associated with a DTLS session key negotiation.

Particular implementations facilitate cryptographic re-keying and processing of encrypted packets. According to particular implementations, the present invention enables network nodes to optimize storage of security association data using a cache, to efficiently update security association data in the cache and in security association memory, and to efficiently access the security association data for decrypting incoming packets. When a controller and a wireless access point initially establish an encrypted session associated with a given tunnel, each of the controller and wireless access point store the security association data resulting from the initial session key negotiation in respective DTLS memory entries. For ease of illustration, the following is described in terms of the controller but also applies equally to the wireless access point. For security, re-keying is performed periodically, where the controller and the wireless access point renegotiate session keys. Responsive to a session key renegotiation, the controller stores new security association information associated with the tunnel in the cache and sets a cache window timer. The controller then uses the security association information, for the tunnel, in the cache as well as the security association information, for the tunnel, in the DTLS memory to decrypt incoming packets associated with the tunnel. The controller determines whether to use the security association information from the cache or from the DTLS memory based on matching the epoch number of a given packet to the epoch numbers of the cache and DTLS memory. When the cache window timer expires, the controller overwrites the security association information, for the tunnel, in the DTLS memory with the security association information, for the tunnel, copied from the cache. As a result, the controller and the wireless access point may exchange new security association data while continuing to exchange encrypted packets. A technical advantage provided by particular implementations of the invention is reduced buffer size requirements.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

B. Example Network System Architecture

B.1. Network Topology

Although the present invention is not limited to application in wireless networks, a wireless network system is described for didactic purposes. FIG. 1A illustrates example components in a wireless local area network (WLAN) system. In a specific embodiment of the present invention, the system includes a central controller 42, a local area networks (LAN) 30, a router 32, and wireless access points 50a-d. The LAN 30 may be implemented by a switch (or an array of switches) and/or other network devices, such as a bridge. As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between central controller 42 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. Central controller 42 is operative to establish encrypted tunnels with one or more access points 50a-50d using a suitable mechanism, such as DTLS. FIG. 1A illustrates one possible network environment in which the invention may operate; however, other implementations are possible.

The wireless access points 50 are operative to wirelessly communicate with remote wireless client devices. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or lightweight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. Central Controller

FIG. 1B illustrates an example hierarchical wireless network including a central controller 42 according to one implementation of the present invention. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with lightweight wireless access points and process wireless protocol and network management information. As FIG. 1B illustrates, a central controller 42 may be directly connected to one or more access points 50. Alternatively, a central controller 24 may be operably connected to one or more access points over a switched and/or routed, network environment, as FIG. 1A illustrates.

FIG. 1C illustrates an example hardware system 100, which may be used to implement a central controller 42. As FIG. 1C shows, in one implementation, the central controller 42 includes a network interface 102, one or more packet processors 106, a system memory 108 that stores one or more software modules such as a policy application including instructions for performing the functions described herein, and a system bus 110 operably connecting these components. In one implementation, each of the packet processors 106 may be application-specific integrated circuit (ASIC)-based with the necessary logic and embedded central processing units (CPUs) for performing some of the functions described herein. The central control elements may optionally include an administrative port 112 allowing for administrative access for such purposes as configuration and diagnostic access.

B.3. Wireless Access Point

FIG. 2 illustrates an example hardware system 300, which may be used to implement a wireless access point 50. In one implementation, the wireless access point 300 includes a processor 310, a memory 312, a network interface 314 (e.g., an 802.3 interface) for communication with a LAN, a cache 316 for storing WLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310.

C. Security Association Data Structures

In the implementations described below, a control plane process maintains a DTLS memory for storing security association data, a cache for storing security association data resulting from session key renegotiations, and an index for indexing the cache and the DTLS memory and for determining, for a given tunnel, whether to access security association data from the cache or from the DTLS memory. A data plane process, typically executed by the controller 42 and one or more wireless access points 50, accesses the index, cache, and DTLS memory in order to access security association data for decrypting incoming packets. FIG. 3 illustrates example data structures, which may be implemented at a central controller and at one or more wireless access points.

In one implementation, the index is a data structure that indexes the cache and the DTLS memory and, for a given tunnel, determines whether to access security association data from the cache or from the DTLS memory. As FIG. 3 shows, the index includes fields for tunnel identifiers (IDs), DTLS pointers, cache bits, and cache pointers. In one implementation, the tunnel ID may be ascertained from the tuple of attributes contained in a given packet. In one implementation, the tunnel tuple may include various data associated with a given packet such as an Internet Protocol (IP) address, a physical port number, UDP protocol source and destination port numbers, a protocol identifier, etc.

In one implementation, the DTLS pointer fields contain pointers (addresses) to the DTLS memory, and the cache pointer fields contain pointers (addresses) to the cache. The cache bit indicates whether access security association data may be accessed from the cache in addition to the DTLS memory. Because the epoch number is a part of the security association data both in the cache and in the DTLS memory, as well as in the packet, the implementation attempts to find a match with epoch number either in the DTLS memory or the cache (if there is no match with an epoch number in the DTLS memory). In one implementation, if the cache bit is set. (e.g., "1"), security association data can be accessed from the cache. Otherwise, the security association data is to be accessed from the DTLS memory.

In one implementation, the DTLS memory is a data structure that stores security association data. In one implementation, the security association data may include a cryptographic key, a cryptographic algorithm, and a replay window, a sequence number that was seen in the last packet that was successfully decrypted, and an epoch number to match with epoch number in the packet. In one implementation, there may be a separate cryptographic key to check a message integrity code (MIC) in an encrypted packet. In one implementation, an epoch number is associated with a given key, where the epoch number changes upon a session key renegotiation. In one implementation, the cryptographic algorithm is operable to decrypt data and to check a MIC. Examples of cryptographic algorithms used by DTLS include Advanced Encryption Standard (AES) and Triple Data Encryption Algorism (Triple DES).

In one implementation, the replay window is a sliding window that includes a bit vector that track packets as they are received. In one implementation, one bit of the bit vector is associates with a sequence number of a given packet. In one implementation, each packet of a series of packets in a session has an associated sequence number that corresponds to one of the bits of the bit vector. While it may be normal for packets to arrive out of sequence, duplicate packets may indicate a so-called replay attack. In one implementation, only packets containing sequence numbers corresponding to bits within a predefined range or window of the bit vector are allowed, and packets containing sequence numbers corresponding to bits that fall outside the predefined range or window of the bit vector are dropped.

In one implementation, the cache is a data structure that also stores security association data, and, possibly, cache-related information (such as a cache window timers for respective entries). In one implementation, the types of security association data stored in the cache is the same as those stored in the DTLS memory. For example, the security association data in the cache may include a cryptographic key, a cryptographic algorithm, and a replay window. In one implementation, when a new set of security association data resulting from a renegotiation is stored in the cache, a cache window timer is set. When the cache window timer expires after a predefined time period (e.g., hours, days, etc.), the time out bit is set (e.g., "1") indicating that the corresponding security association data is to be written to the DTLS memory in order to overwrite the corresponding (older) security association data.

In particular implementations, the data structures may be implemented in an ASIC. In particular implementations, the ASIC of a central controller may allocate a larger amount of memory space to data structures (e.g., cache, DTLS memory, and index) than the amount an ASIC of a wireless access point would allocate. This is because a central controller manages many wireless access points and thus many numerous DTLS sessions (e.g., one or more session per wireless access point). For example, in one implementation, DTLS memory may have sufficient space for up to 1,000 or more entries. A DTLS memory for a wireless access point may include fewer entries in the memory space. For example, in particular implementations, a given wireless access point may manage as few as 1-4 DTLS sessions between it and a controller 42.

In particular implementations, with both a given controller and a given wireless access point, the cache would store additional keys for 5-10% of the sessions supported in the security association database in the DTLS memory. Hence, the storage space required for security association data in the cache will be 5-10% of that of the DTLS memory. In particular embodiments, the comparative ratio is based on an estimate of the number of sessions that will be re-keyed within a window of time. For example, a larger number sessions requiring re-keying would require a larger cache. Also, a smaller window of time may require shorter expiration periods. In one implementation, a network administrator may determine the appropriate balance of these variables.

In another example, if a maximum of 1,024 DTLS sessions can be supported by a given controller or wireless access point, there should to be sufficient memory to hold security association data for the 1,024 sessions. If it is decided to support re-key (ChangeCipherSpec) operation of at most 10% of those sessions in a system, the cache would have sufficient memory to hold 103 more sets of security association data. During the DTLS re-key process, the old security association data (e.g., key) will be stored in one of the 1,024 DTLS memory locations, and the new key will be stored in one of the 103 cache locations.

D. DLTS Session Key Negotiations (Control Plane Process)

As described above, a control plane process maintains a DTLS memory for storing security association data, a cache for storing new security association data resulting from session key renegotiations, and an index for indexing the cache and the DTLS memory and for determining whether access security association data may be accessed from the cache in addition to the DTLS memory.

Figure 5:
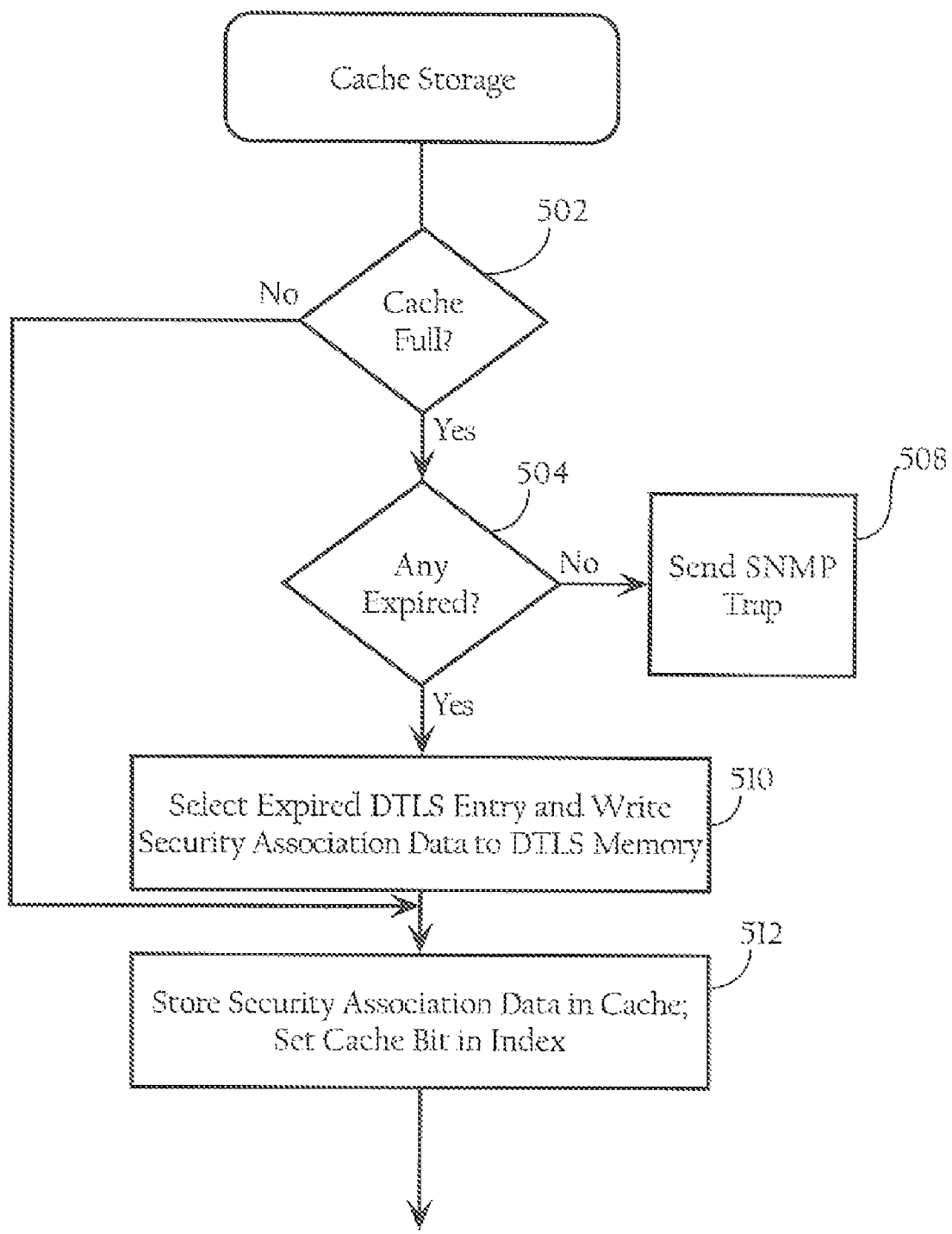
FIG. 5 illustrates an example process flow associated with storing DTLS security association data in a cache.

FIG. 4 illustrates an example process flow associated with a DTLS session key negotiation. For ease of illustration, the following processes in connection with FIGS. 4-6 are described from the perspective of a controller 42 but may be equally implemented at and by a wireless access point 50 or any other suitable network nodes. In particular implementations, because the controller 42 and the wireless access points 50 exchange and process packets simultaneously, the controller 42 and the wireless access points 50 may perform the processes described herein concurrently.

As FIG. 4 shows, the controller 42 negotiates one or more keys for the DTLS session (402). As described above, one or multiple DTLS sessions (involving a single key or multiple separate keys) may be used for data packets and control packets. The controller 42 then determines if the DTLS session is a (first-time) session initiation (404). If yes, the controller 42 stores the security association data in the DTLS memory (406). If it is not a session initiation, the controller 42 stores the security association data in the cache (408). The controller then sets a timer threshold (e.g., 1-2 milliseconds) and sets the cache window timer based on the timer threshold (410). As described in more detail below in connection with FIG. 6, when the cache window timer expires, the controller 42 overwrites the security association data in the DTLS memory with the DTLS security association data in the cache.

E. Storing Security association Data in a Cache

FIG. 5 illustrates an example process flow associated with storing security association data in a cache. As FIG. 5 shows, after a DTLS renegotiation, when the controller 42 has new security association data, the controller first determines whether the cache is full (502). If not, the controller 42 selects a cache entry and stores the security association data in the cache (512). If the cache is full, the controller determines if any of the cache window timers have expired (504). The cache being full and none of the cache window timers being expired may indicate a number of issues. For example, the cache size may need to be increased, or the timer thresholds may need to be shorter, or the new sessions may need to be staggered over longer periods of time, etc. These issues may be resolved by a network administrator. As such, the controller 42 may set a Simple Network Management Protocol (SNMP) trap to notify a network administrator (508). Given the current size of the cache, the network administrator may then reconfigure the controller. If any of the cache window timers have expired, the controller 42 selects an expired entry in the cache and writes the security association data from the selected cache entry to the corresponding entry in the DTLS memory (510). This updates the corresponding entry of DTLS memory and frees up an entry in the cache. The controller then stores the new DTLS security association data in the cache and sets the cache bit in the index (512). In one implementation, in addition to setting the cache bit in index, the DTLS memory may also have storage for the cache index. As a result, the engine will know in which entry of cache to look for the additional security association data, if the cache bit is set.

FIG. 5 illustrates a process where writing security association data from the cache to the DTLS memory is triggered by the need to write new security association data in the cache. There are several ways to write DTLS security association data from the cache to the DTLS memory. For example, in one implementation, upon expiration of a cache window timer, hardware or software may overwrite the security association data in the DTLS memory with the security association data from the cache. In this implementation, the hardware maintains the cache window timer. In one implementation, upon expiration of a cache window timer, hardware may transmit an interrupt to the software instructing the software to overwrite the security association data in the DTLS memory with the security association data from the cache.

F. Packet Processing

As described above, a data plane process, typically executed by the controller 42 and one or more wireless access points 50 accesses the index, cache, and DTLS memory for security association data to decrypt incoming packets.

FIG. 6 illustrates an example process flow associated with real-time processing of packets. As FIG. 6 shows, the controller receives a packet (602). In one implementation, the controller 42 can determine from the packet the epoch number, sequence number for the replay window, and the tunnel identifier. The controller 42 can map the packet to the tunnel based on a tuple of attributes (e.g., IP address, port number, protocol identifier, and protocol port numbers).

The controller then determines if the cache bit is set (604). The cache bit indicates whether to check the cache for the DTLS security association data. In one implementation, if the cache bit is not set, the controller 42 determines if the epoch number of the packet matches the DTLS epoch number in the DTLS memory (606). If so, the controller 42 DTLS decrypts the packet using the DTLS security association data in the DTLS memory (608). If not, the controller 42 drops the packet (610).

If the cache bit is set (604), the controller 42 determines if the cache window timer has expired (612). If the cache window timer has not expired, the controller 42 determines if the epoch number of the packet matches the epoch number in the cache (614). If yes, the controller 42 DTLS decrypts the packet using the DTLS security association data in the cache (616).

If the epoch number of the packet does not match the epoch number in the cache, the controller 42 determines if the epoch number of the packet matches the epoch number in the DTLS memory (618). If yes, the controller 42 DTLS decrypts the packet, using the DTLS session security data in the DTLS memory (620). If no, the controller 42 drops the packet (622).

If the cache window timer has expired (612), the controller determines if the epoch number of the packet matches the epoch number in the cache (624). If no, the controller 42 drops the packet (626). If yes, the controller 42 DTLS decrypts the packet using the DTLS session security data in the cache (628). The controller 42 also writes the security association data from the cache to the DTLS memory (630). In one implementation, as a part of the copy process, the controller 42 also resets the cache bit in the index.

Implementations described herein provide numerous benefits. For example, one benefit is the reduced cost of buffering, as the cache provides a buffer for security association data (e.g., keys) for a small percentage of the supported DTLS sessions. Buffering the security association data reduces the need to buffer packets, because the implementations described herein enable a higher throughput of packets.

In particular implementations, the savings may be a function of the number of DTLS connections supported by the system and the performance of the controller or wireless access point. For example, if the cache can store security association data for 10% of 1,024 supported DTLS sessions, and if the keying material of each session requires about 128 bytes storage, the cache may add 12 Kbytes of memory to the on-chip buffer.

In comparison to memory requirements for the cache, memory requirements for buffers for packets are much greater. For example, if the number of packets requiring buffering amounts to what the TLS specification recommends, and if the "small window of time" is 1 millisecond on a single Gigabit link, 744 128-byte packets may be received. Hence, the packet buffer space requirement will be 95 Kbytes of memory. If the controller or wireless access point implementing DTLS supports N Gigabits per second bandwidth, there may be as many as 95*N Kbytes of packet buffer required. Hence, the savings is 95*N-12 Kbytes.

In a scenario where neither the buffer recommended by the TLS specification is implemented nor the cache is implemented, packets encrypted with new cryptographic keys by the transmitter during a re-key sequence will need to be tossed by the receiver until the new key replaces the old key. After the replacement, any packet that was encrypted with the old key and still in transit will be tossed. The impact of tossing packets will be poor quality of voice and video reception. Implementations described herein avoid this problem.

In other implementations, the present invention may be applied to other encryption protocols such as TLS, as well to other encryption protocols that require re-keying, in addition to DTLS and TLS. For example, with respect to TLS implementations, instead of using an epoch number to determine whether to access the cache or a TLS memory for security association data, the controller may determine if the cache window timer has expired. If so, the controller may decrypt a given packet using TLS security association data in the cache. In one implementation, if there is a decrypt error, the controller may decrypt the packet using the TLS security association data in the TLS memory.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A non-transitory computer-readable medium comprising executable instructions operable, when executed, to:
   responsive to an initial session key negotiation, store a first security association information, comprising a first encryption key, for a tunnel in a security association memory;
   responsive to a session key renegotiation, store a second security association information different from the first security association, comprising a second encryption key, for the same tunnel in a cache;
   prior to an expiration condition, decrypt received packets associated with the tunnel conditionally using the second security association information in the cache or the first security association information in the security association memory based on identifiers associated with each of the received packets; and
   upon the expiration condition, overwrite the security association information, for the tunnel, in the security association memory with the security association information, for the tunnel, copied from the cache;
   wherein, before storing security association information for the tunnel in a cache, if the cache is full and if one or more expiration conditions have occurred, the executable instructions further operable, when executed, to:
   select an expired entry in the security association memory; and write the security association data from a corresponding cache entry to the selected expired entry in the security association memory.

2. The non-transitory computer-readable medium of claim 1 wherein, before storing security association information for the tunnel in a cache, if the cache is full and if no expiration conditions have occurred, the executable instructions further operable, when executed, to notify an administrator.

3. The non-transitory computer-readable medium of claim 1 wherein, after storing security association information for the tunnel in a cache, the executable instructions further operable, when executed, to indicate in an index that the security association information for the tunnel is stored in the cache.

4. The non-transitory computer-readable medium of claim 1 wherein the executable instructions further operable, when executed, to:
   set a time threshold upon storing security association information for the tunnel in the cache; and
   start a timer based on the time threshold, wherein the expiration condition is based on the time threshold.

5. The non-transitory computer-readable medium of claim 1 wherein the executable instructions further operable, when executed, to cause hardware to perform the storing of the security association information for the tunnel in the cache.

6. The non-transitory computer-readable medium of claim 1 wherein the executable instructions further operable, when executed, to transmit a hardware interrupt to cause software to perform the storing of the security association information for the tunnel in the cache.

7. The non-transitory computer-readable medium of claim 1 wherein the security association information comprises an encryption algorithm based on Transport Layer Security.

8. The non-transitory computer-readable medium of claim 1 wherein the security association information comprises an encryption algorithm based on Datagram Transport Layer Security.

9. A method comprising:
   storing a first security association information comprising a first encryption key for a tunnel in a security association memory responsive to an initial session key negotiation;
   storing a second security association information different from the first security association information, comprising a second encryption key, for the same tunnel in a cache responsive to a session key renegotiation;
   prior to an expiration condition, decrypting received packets associated with the tunnel conditionally using the second security association information in the cache or the first security association information in the security association memory based on identifiers associated with each of the received packets; and
   overwriting, upon the expiration condition, the security association information, for the tunnel, in the security association memory with the security association information, for the tunnel, copied from the cache
   wherein, before storing security association information for the tunnel in a cache, if the cache is full and if one or more expiration conditions have occurred, the method further comprises:
   selecting an expired entry in the security association memory; and
   writing the security association data from a corresponding cache entry to the selected expired entry in the security association memory.

10. The method of claim 9 wherein, before storing security association information for the tunnel in a cache, if the cache is full and if no expiration conditions have occurred, the method further comprises notifying an administrator.

11. The method of claim 10 wherein, after storing security association information for the tunnel in a cache, the method further comprises indicating in an index that the security association information for the tunnel is stored in the cache.

12. The method of claim 9 further comprising:
   setting a time threshold upon storing security association information for the tunnel in the cache; and
   starting a timer based on the time threshold, wherein the expiration condition is based on the time threshold.

13. The method of claim 9 further comprising causing hardware to perform the storing of the security association information for the tunnel in the cache.

14. The method of claim 9 further comprising transmitting a hardware interrupt to cause software to perform the storing of the security association information for the tunnel in the cache.

15. The method of claim 9 wherein the security association information comprises an encryption algorithm based on Transport Layer Security.

16. The method of claim 9 wherein the security association information comprises an encryption algorithm based on Datagram Transport Layer Security.

17. An apparatus comprising:
   one or more processors;
   a memory operative to store security association information for one or more tunnels; and
   executable instructions encoded on non-transitory computer-readable media, the executable instructions operable when executed to:

responsive to an initial session key negotiation, store a first security association information, comprising a first encryption key, for a tunnel in a security association memory;

responsive to a session key renegotiation, store a second security association information different from the first security association information, comprising a second encryption key, for the same tunnel in a cache;

prior to an expiration condition, decrypt received packets associated with the tunnel conditionally using the second security association information in the cache or the first security association information in the security association memory based on identifiers associated with each of the received packets; and upon the expiration condition, overwrite the security association information, for the tunnel, in the security association memory with the security association information, for the tunnel, copied from the cache wherein, before storing security association information for the tunnel in a cache, if the cache is full and if one or more expiration conditions have occurred, the executable instructions further operable, when executed, to:

select an expired entry in the security association memory; and write the security association data from a corresponding cache entry to the selected expired entry in the security association memory.

18. The apparatus of claim 17 wherein, before storing security association information for the tunnel in a cache, if the cache is full and if no expiration conditions have occurred, the executable instructions further operable, when executed, to notify an administrator.

19. The apparatus of claim 17 wherein, after storing security association information for the tunnel in a cache, the executable instructions further operable, when executed, to indicate in an index that the security association information for the tunnel is stored in the cache.

20. The apparatus of claim 17 wherein the executable instructions further operable, when executed, to:

set a time threshold upon storing security association information for the tunnel in the cache; and start a timer based on the time threshold, wherein the expiration condition is based on the time threshold.

21. The apparatus of claim 17 wherein the executable instructions further operable, when executed, to cause hardware to perform the storing of the security association information for the tunnel in the cache.

22. The apparatus of claim 17 wherein the executable instructions further operable, when executed, to transmit a hardware interrupt to cause software to perform the storing of the security association information for the tunnel in the cache.

23. The apparatus of claim 17 wherein the security association information comprises an encryption algorithm based on Transport Layer Security.

24. The apparatus of claim 17 wherein the security association information comprises an encryption algorithm based on Datagram Transport Layer Security.

* * * * *